A. B. Smith,
Chain Propeller.
No. 70030.　　　　　　　　　Patented. Oct. 22. 1867.
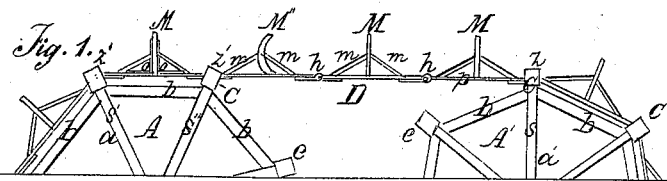
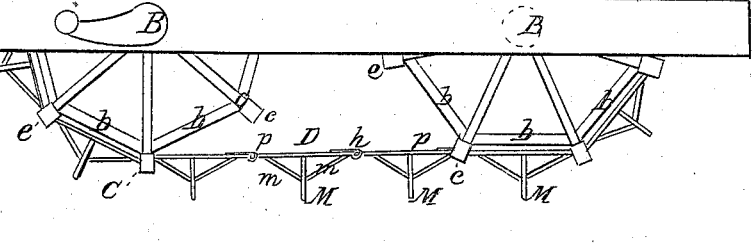
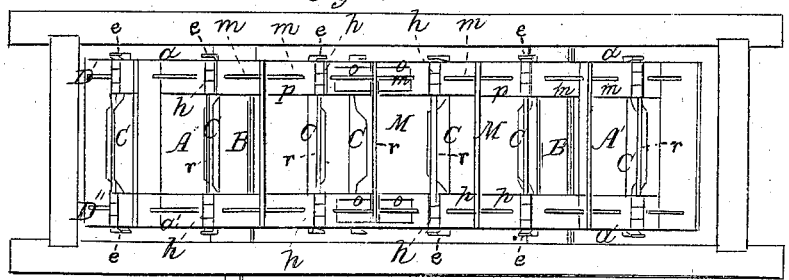
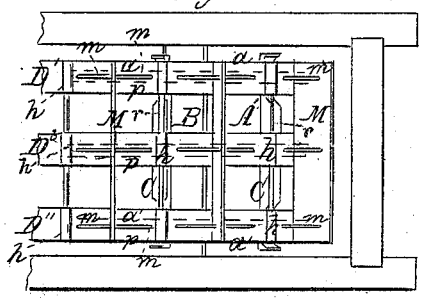
Witnesses　　　　　　　　　Inventor
Chas. A. Pettit　　　　　　A. B. Smith
J. H. Meister　　　　　　　by Munn & Co.
　　　　　　　　　　　　　　Attorneys

United States Patent Office.

AMROY B. SMITH, OF YANKTON, DAKOTA TERRITORY, ASSIGNOR TO HIMSELF AND FRANK M. SMITH, OF CHICAGO, ILLINOIS.

Letters Patent No. 70,036, dated October 22, 1867.

IMPROVEMENT IN ENDLESS-CHAIN PROPELLERS.

The Schedule referred to in these Letters Patent and making part of the same.

TO ALL WHOM IT MAY CONCERN:

Be it known that I, AMROY B. SMITH, of Yankton, and Territory of Dakota, have invented a new and improved Propeller and Current-Wheel; and I do hereby declare the following to be a full, clear, and exact description of the same, reference being had to the accompanying drawings, forming part of this specification, and in which—

Figure 1 is a side elevation of my invention,

Figure 2 is a top view of the same, and

Figure 3 is a top view showing a modification of the construction of the wheels.

This invention is a device which can be used as an "endless-chain propeller" for steamboats, or as a water-wheel to be rotated by a running stream for the purpose of furnishing motive power to drive machinery.

My apparatus consists of two large shafts, each carrying a wheel on each of its extremities. The wheels belonging to the same shaft are united by strong bars extending between the outer ends of their spokes or radial arms. Over the connecting-bars runs an endless belt, consisting of two endless chains, one near each wheel, connected together by strong rods. The belt carries paddles or buckets on its outer surface, which, as it revolves, dip into the water and propel the boat along. When used as a water-wheel, the current impinges against the buckets and turns the wheels.

Similar letters of reference indicate corresponding parts in the several figures.

In the drawings, A A', the large compound wheels, composed of the end wheels $a$ $a'$, united at their centre by the shafts B B, upon which they run, and at their circumference by the stout bars C C, extending from the extremities of the spokes of one of the end wheels $a$ upon each shaft to the extremities of the spokes of its companion wheel $a'$ at the other end of the same shaft. The stout bars C C are provided with a stout ledge or raised bed, extending along their centre on that side which is farthest from the shaft B that carries the wheels to which they are attached. This bed or ledge is deeply grooved along its upper surface, as shown at $c$ $c$. The ends of the bars are turned up, as shown at $e$ $e$, to prevent the endless chains from running off of the wheels. The spokes of the wheels are so arranged that when any spoke, $s$, of one of the wheels $a$ is in a vertical position, the wheel $a$ running on the other shaft will not have any of its spokes on that side vertical, but will have two spokes, $s'$ $s''$, situated at equal distances on each side of a vertical line, as shown in fig. 1. The object of this particular arrangement is to cause the endless belt to run evenly. If it were arranged otherwise, the centre of the belt, between the two compound wheels A A', would be constantly oscillating up and down, as its ends rested alternately on a single bar directly over the axle, as at $z$, fig. 1, or on two bars on each side of a vertical line through the axle, as at $z'$ $z'$, fig. 1. The spokes being thus arranged, the ends of those on the same wheel are connected by stout braces $b$ $b$ to steady and strengthen the wheels. Over the two compound wheels A A' thus constructed runs an endless belt, D, composed of two endless chains, D' D'', connected by the stout rods $r$ $r$. Each chain is made of a series of strong plates $p$ $p$, hinged together as shown at $h$ $h$, the length of the plates from the centres of the hinges being exactly equal to the distance from the centre of any connecting-bar C to the centre of the adjacent connecting-bar. The rods $r$ $r$ are attached at the hinges $h$ $h$. By this arrangement each hinge, in passing over a wheel, will rest in the channel $c$ of the connecting-bar. The endless belt will thus be held firmly and steadily on the wheels, without any possibility of slipping, and in such a manner as not to wear or warp it out of shape, while at the same time it does not in the slightest interfere with the motion of the wheels. The chains D' D'', running between the ends of the channelled beds on the bars C C, and the turned-up ends of the bars over the wheels $a$ $a'$ will be prevented from slipping in either direction. The weight of each chain D' D'' will evidently be borne by the wheel directly under it. To the outer surface of the endless belt thus constructed and operating are attached buckets or paddles M M, of the form shown in the drawings, resting on edge on the plates $p$ $p$, one paddle at the centre of each plate. When the apparatus is used as a propelling-wheel for boats the buckets or paddles are simple plain boards, as shown at M M. When used as a current-wheel for impelling machinery the paddles should be curved, as shown at M', the concave side being presented toward the current to receive its impact. Each bucket is fastened securely in its place by braces $m$ $m$ on each side. It may be additionally secured and strengthened by stout plates,

*o o*, bent at right angles and fastened to the buckets, and to the plates on each side of every bucket, as shown at *n n*, figs. 1 and 2. The apparatus may be further strengthened by another wheel running between the wheels *a a'*, as shown in fig. 3, and by another endless chain, D³, attached to the buckets in their centre. In case more than two wheels and chains are used in constructing the large wheels A A' and belt D, they will be formed and connected with the other parts of the apparatus in the manner above described, those changes only being made which any skillful mechanic can suggest to adapt them to their position. One or more large wheels may be used between the wheels A A' to sustain the centre of the endless belt, if found necessary.

I do not intend to confine myself to that particular construction of the pieces *e e* which consists, as here shown, in forming them by bending up the ends of the bars C C, but I may form the pieces *e e* of separate bevelled blocks bolted to the periphery or side of the wheels *a a'*, or I may simply extend the ends of the spokes beyond the periphery and bevel them down for the purpose.

The shafts B B' may be connected by a pitman and cranks, so as to run always at the same speed and maintain the same relative position toward each other.

I am aware that an endless chain carrying buckets or paddles has been used before for propelling vessels. I do not broadly claim such a device as my invention; but what I do claim as new, and desire to secure by Letters Patent, is the following, viz:

1. The polygonal wheels A A', each having an odd number of angles, when so placed in relation to each other that when an angle of one is vertically above its shaft two angles of the other shall be equidistant from a vertical line passing through its shaft, in combination with the endless chain of buckets, in the manner described.

2. The endless belt D composed of the plates *p p*, constructed as shown, and connected by the hinges *h h* and rods *r r*, and bearing the buckets M M, when constructed and operating substantially in the manner and for the purposes specified.

3. The combination of the belt D and wheels A A' in such a manner that in passing over the wheels the hinges *h h* and connecting-rods *r r* of the belt shall rest on and be supported by the bars C C, substantially as and for the purposes shown.

4. The connecting-bars C C, having the channelled bed in their centre and their extremities bent up, substantially as and for the purposes set forth.

To the above specification of my improvement I have signed my hand this twentieth day of August, 1867.

AMROY B. SMITH.

Witnesses:
JAMES H. GRIDLEY,
CHARLES A. PETTIT.